United States Patent [19]
Hasegawa

[11] Patent Number: 6,088,724
[45] Date of Patent: *Jul. 11, 2000

[54] COMMAND INPUT CONTROL SYSTEM AND METHOD FOR USE WITH PLURAL COMMANDS

[75] Inventor: Satoshi Hasegawa, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,496

[22] Filed: Jul. 2, 1997

[30] Foreign Application Priority Data

Jul. 4, 1996 [JP] Japan ................................. 8-174499

[51] Int. Cl.$^7$ ........................................................ H04N 7/14
[52] U.S. Cl. .............................. 709/219; 348/7; 348/12; 455/5.1; 345/327
[58] Field of Search ................................. 348/7, 12, 13; 395/200.47, 560, 200.61; 386/68, 82; 345/327; 709/217–219; 455/5.1; H04N 7/10

[56] References Cited

U.S. PATENT DOCUMENTS 5,668,948  9/1997  Belknap et al. .................... 395/200.61

FOREIGN PATENT DOCUMENTS

| | | |
|---|---|---|
| 63-100891 | 5/1988 | Japan . |
| 63-209243 | 8/1988 | Japan . |
| 4-324784 | 11/1992 | Japan . |
| 7-84556 | 3/1995 | Japan . |

*Primary Examiner*—John W. Miller
*Attorney, Agent, or Firm*—Ostrolenk, Faber, Gerb & Soffen, LLP

[57] ABSTRACT

In a multi-media communication terminal device, when commands for respective reproduction modes are sequentially input within a short period, errors in synchronization of the image and sound, causing disturbances of the image and sound and unwanted video and audio output, can be avoided. When the user inputs a command to the multi-media communication terminal device, control software executed in a CPU inhibits the input of the next command. When the video data corresponding to the first input command is fed to the multi-media communication terminal device from a superior device, decoding of the video data is initiated in the video data decoding portion. When decoding of the new video data by the video data decoding portion has been confirmed, the CPU is interrupted. When interruption is confirmed, the control software permits the next command, which had been inhibited, to be inputted.

19 Claims, 5 Drawing Sheets

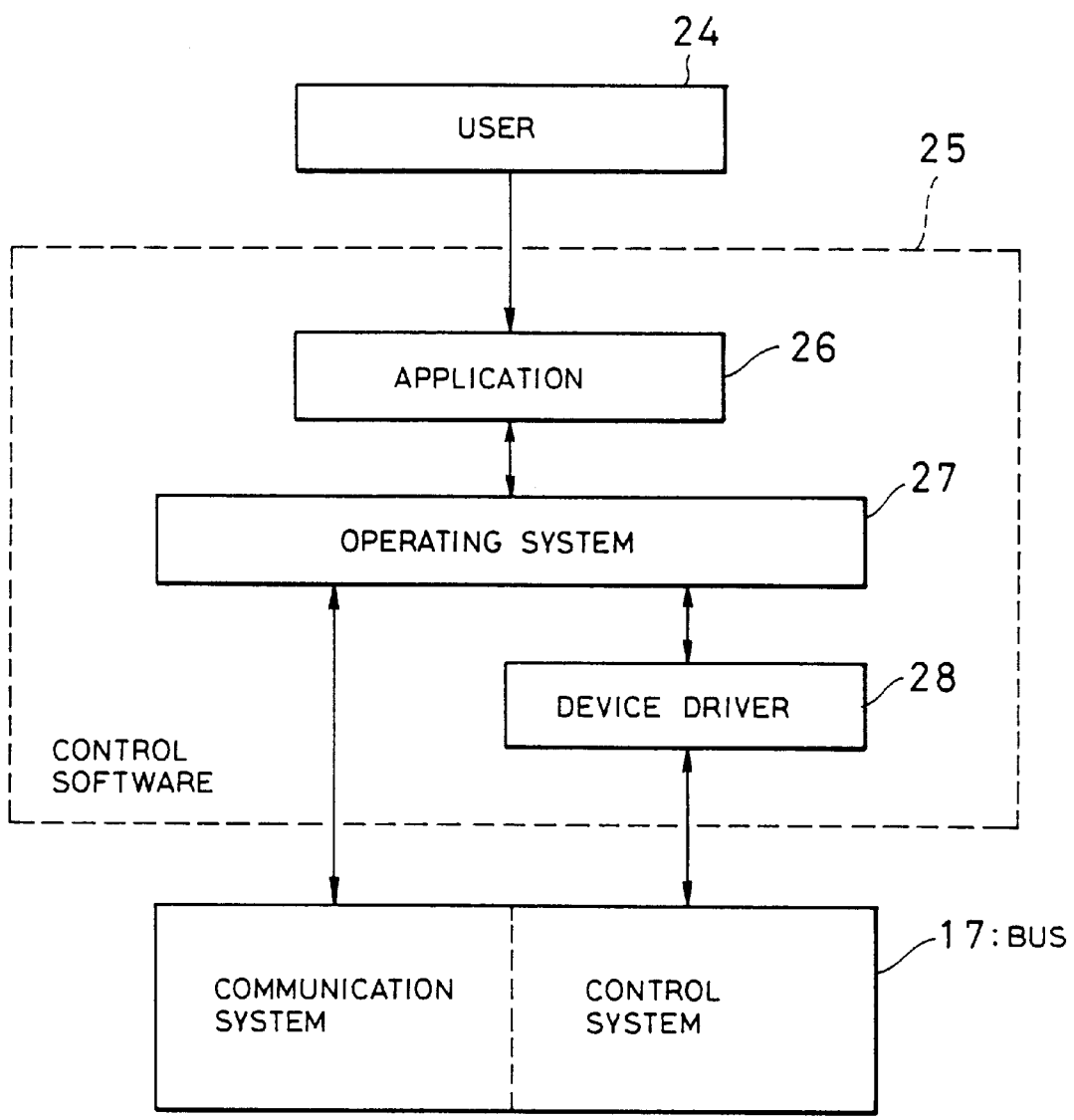

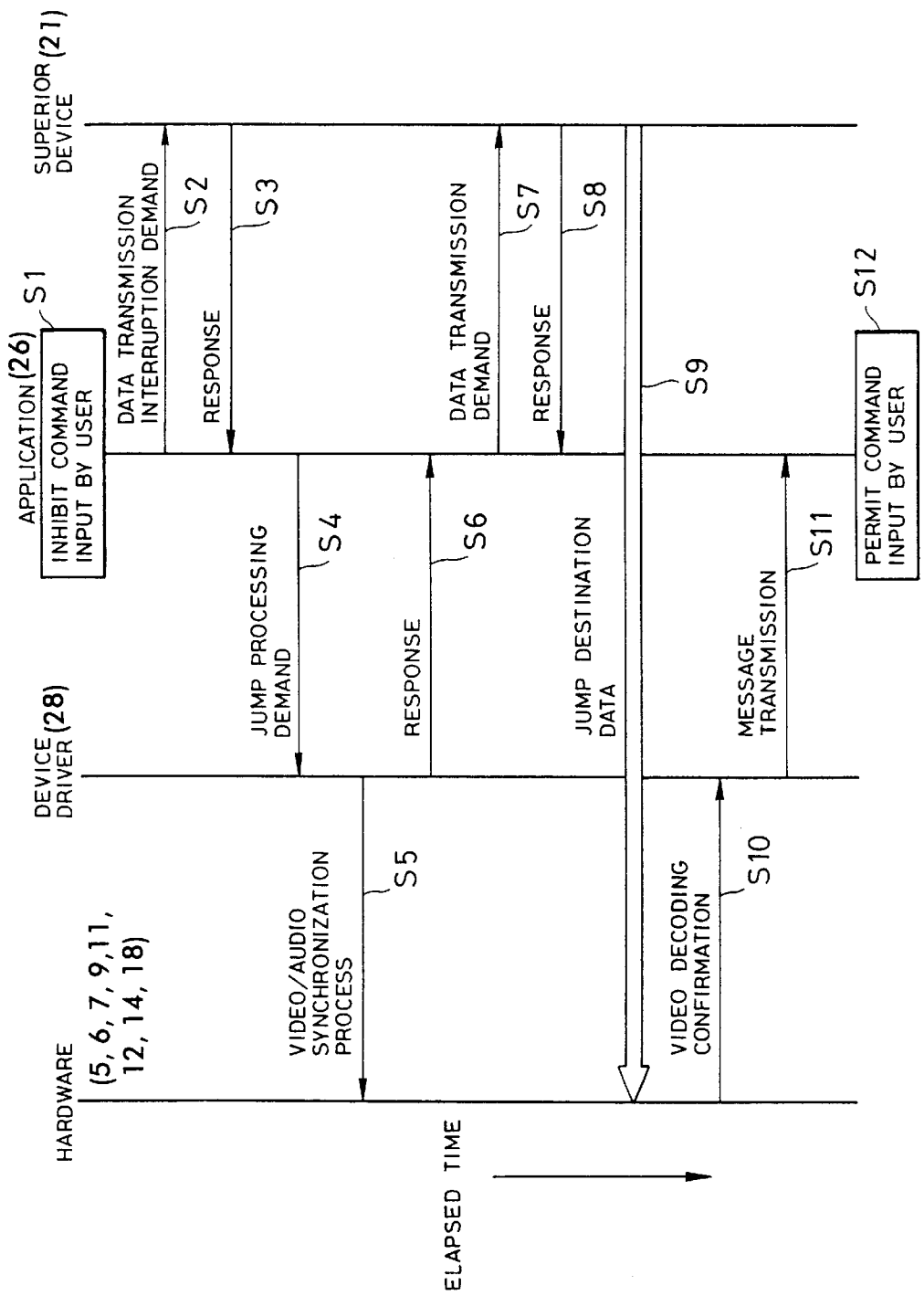

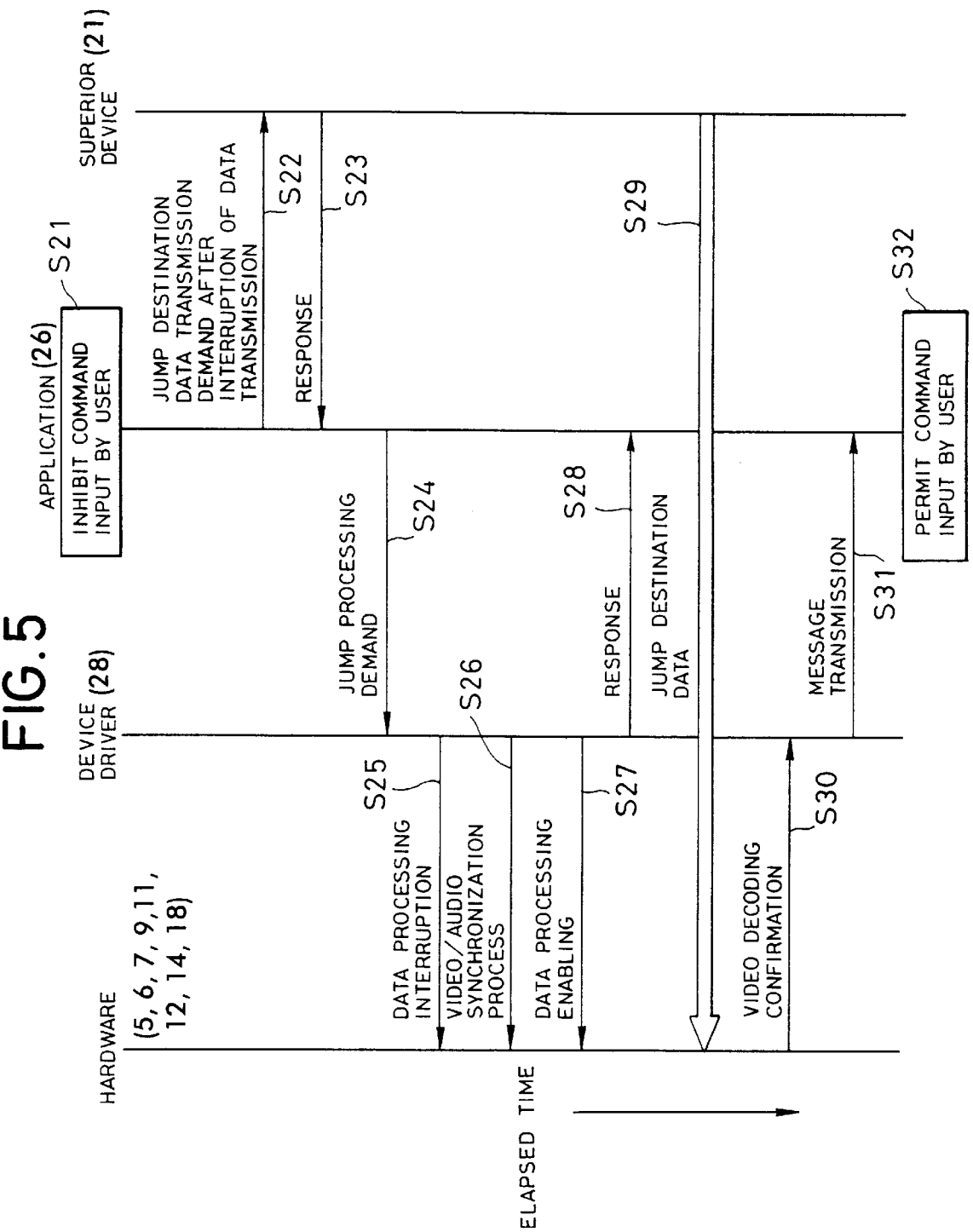

COMMAND INPUT CONTROL SYSTEM AND METHOD FOR USE WITH PLURAL COMMANDS

BACKGROUND OF THE INVENTION

1. Field of the Invention

The present invention relates to a command input control system, and to a method for controlling input of commands to a multimedia communication terminal device of a type used for reproducing entertainment or educational software which has been transmitted through a communication line. More specifically, the invention relates to a command input control system and control method for use where a plurality of commands, for example, for initiating respective reproduction modes, potentially may be sequentially input within a short period by the user.

2. Description of the Related Art

Currently, development of a television service known as VOD (Video On Demand) using a communication line, such as a cable television (CATV) system, is in progress. In such a service, as disclosed in Japanese Unexamined Patent Publication (Kokai) No. Heisei 4-324784, one end of a transmission line is connected to a recording medium or a recording apparatus which supplies and controls the supply of multi-media data, known as a head end apparatus. The other end of the transmission line is connected to one or more multi-media communication terminal devices, such as a set top box (STB) installed for each subscriber. The STB is connected to a television set or television receiver having a display and an interface to receive the VOD service. Currently, development of such systems by developers is ongoing.

In such a multi-media communication system employing a communication network, when a command is input in the form of an interrupt signal to the multi-media communication terminal device from a superior system, such as the head end apparatus mentioned above, it is possible for the interrupt signal to cause dropping out and disturbance of the video data and sound data which are being reproduced currently. Therefore, in order to avoid this problem, Japanese Unexamined Patent Publication No. Showa 63-209243 discloses a technology for pausing the multi-media data which is being reproduced currently from the superior system, then subsequently releasing the pause mode upon termination of the interrupt process, and then again initiating transmission of the multi-media data.

On the other hand, when a command for changing to a new reproduction mode, for example, is input by the subscriber, to the multi-media communication terminal device, it becomes necessary to avoid a disturbance of the video image which is associated with switching into the new reproduction mode. Particularly when switching to a reproduction speed which is lower than a normal reproduction speed, such as slow motion reproduction, or field search (field-by-field reproduction), the possibility of causing such disturbance becomes high. As a solution for this, it may be possible to control the amount of multi-media data transmitted from the superior device and to transmit only a predetermined amount of data at every occurrence of a demand for data transmission from the multi-media communication terminal device.

In the conventional multi-media communication service using the communication line as described above, if the commands relating to the reproduction mode of the multi-media data are sequentially input by the user within a short period of time, it becomes possible to cause a disturbance in the reproduced video image or audio sound or to output an unintended image or sound. Also, when synchronization of the video image and the audio sound is included in the reproduction mode requested by the user, an error in synchronization of the video image and the audio sound is likely to occur.

Therefore, it becomes necessary to exercise control over input commands so as not to cause disturbance in the video image even when the commands are sequentially input within a short period.

SUMMARY OF THE INVENTION

In view of the drawbacks in the prior art, it is an object of the present invention to provide a system and method for command control which can suppress disturbance of a video image and/or audio sound even when the commands are sequentially input within a short period.

According to one aspect of the invention, a command input control system for controlling an input command designating a reproduction mode of video data transmitted from a center (a "superior device") to a terminal device via a communication line, comprises:

command input inhibiting means for inhibiting input of a second command until video data corresponding to a first input command is supplied from said center when said input commands are sequentially input.

Preferably, the command input inhibiting means includes means for transmitting a command demanding interruption of the video data currently transmitted from a center. In such case, the command input inhibiting means may include means for demanding transmission of the video data corresponding to the first input command to said center after receiving a response to the command demanding interruption of transmission.

The data transmitted from said center via the communication line may include audio data, and said command input inhibiting means may include means for designating a process for establishing synchronization of newly transmitted video data and audio data with respect to hardware of an external signal processing system and means for interrupting transmission of the currently transmitted data from said center, and subsequently, transmitting a start demand to said center.

The command input inhibiting means may be application software. The means for designating a process for establishing synchronization of the video data and the audio data in the newly transmitted data, with respect to the hardware of said external signal processing system, may be device driver software.

According to another aspect of the invention, a command input control method for controlling input of a command designating a reproduction mode of video data transmitted from a center to a terminal device via a communication line comprises the steps of:

a command input inhibiting step of inhibiting input of a second command until video data corresponding to a first input command is supplied from said center when said input commands are sequentially input.

According to a further aspect of the invention, a multi-media communication terminal device receiving multi-media data including a video data component and an audio data component from a data source through a communication network, comprises:

a data input connected to said data source via said communication network and receiving said multi-media data from said data source;

a data processing system processing said multi-media data for reproducing video data contained in said video data component and audio data contained in said audio data component;

a user interface permitting a user to interactively input a command for selecting among a plurality of operation modes, said user interface including command input inhibiting means for inhibiting input of a second command until video data corresponding to a first input command is supplied from said center when said input commands are sequentially input; and a data output connected to a video output device for visually reproducing said video data and an audio output device for audibly reproducing said audio data.

BRIEF DESCRIPTION OF THE DRAWINGS

The present invention will be understood more fully from the detailed description given hereinafter and from the accompanying drawings of the preferred embodiment of the present invention, which, however, should not be taken to limit the present invention, but are for explanation and understanding only.

In the drawings:

FIG. 3 is a block diagram showing one embodiment of control software to be executed by a CPU; and FIG. 4 is a chart showing a sequence of operations in the preferred embodiment of the multi-media communication terminal device according to the present invention; and FIG. 5 is a chart showing another sequence of operations in the preferred embodiment of the multi-media communication terminal device according to the present invention.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessarily obscuring the present invention.

Figure 1:
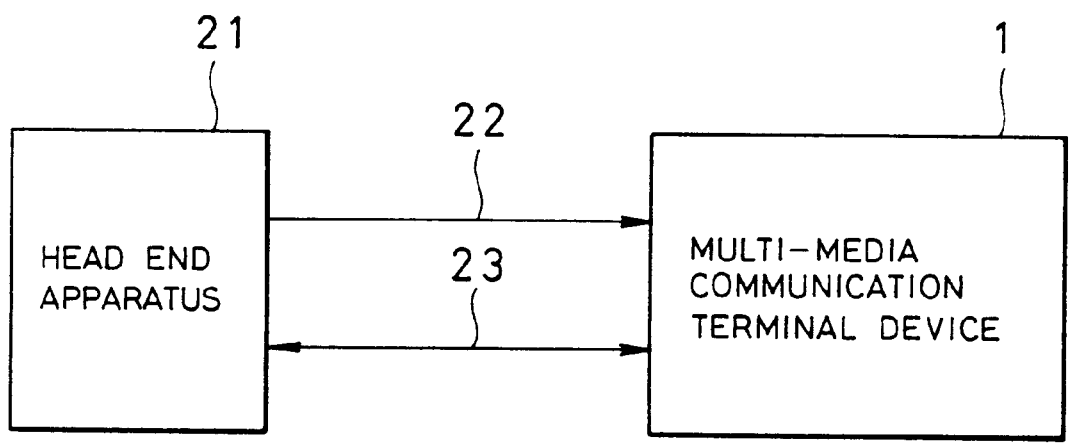
FIG. 1 is a schematic block diagram showing a preferred embodiment of a connection arrangement of a multi-media communication terminal device according to the present invention.

FIG. 1 shows an example of a connection between the preferred embodiment of a multi-media communication terminal device and a system utilizing a communication line such as a cable television (CATV) system. A multi-media communication terminal device 1 is connected to a head end apparatus 21 (referred to at times as a "superior device") which is a recording medium, a recording apparatus or the like which supplies multi-media data and controls the supply of the multi-media data, via a transmission line 22 transmitting the multi-media data and a control line 23 performing transfer of a control signal.

Figure 2:
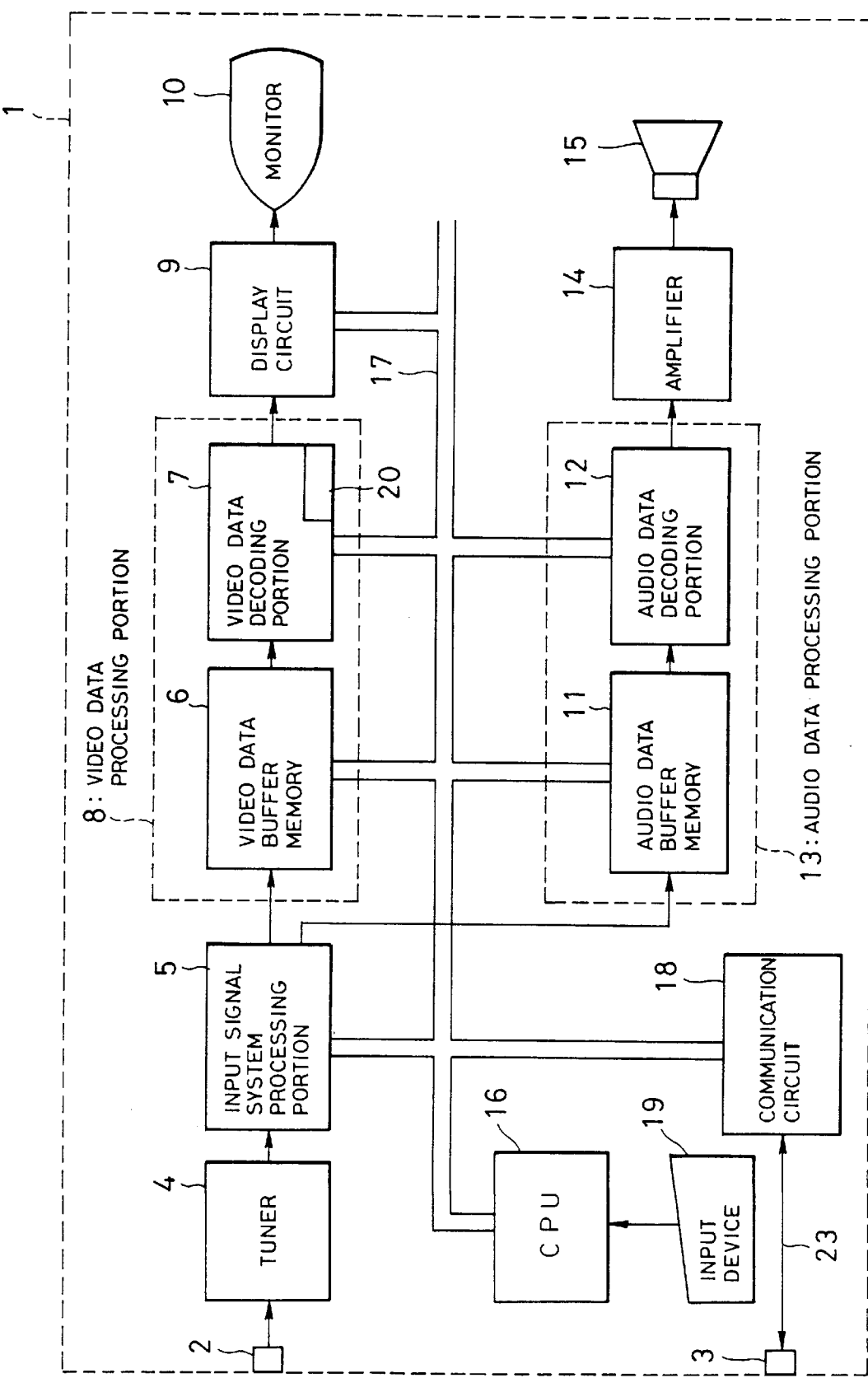
FIG. 2 is a schematic block diagram showing one embodiment of a construction of the multi-media communication terminal device according to the present invention.

FIG. 2 is a block diagram showing the preferred embodiment of the multi-media communication terminal device 1 according to the present invention.

Referring to FIG. 2, the multi-media communication terminal device 1 includes an input end 2 for receiving input of the multi-media data transferred from the head end apparatus 21 via the transmission line 22, a tuner 4 selecting a desired channel among a plurality of channels, an input signal system processing portion 5 separating the input multi-media data into video data, audio data and optionally other data (not shown in FIG. 2), a video data processing portion 8 for decoding the video data from the input signal system processing portion 5, a monitor 10 for displaying the decoded video data, a display circuit 9 for performing a process for displaying the decoded video data on the monitor 10, an audio data processing portion 13 for decoding the audio data from the input signal system processing portion 5, a speaker 15 for reproducing an audio sound of the decoded audio data, an amplifier circuit 14 for amplifying a signal containing the decoded audio data for reproduction by the speaker 15, a CPU 16 for controlling the operation of the respective modules under program control, a bus 17 for transmitting operation control signals from the CPU 16, an input device 19, such as a keyboard or the like, a communication circuit 18 for transmitting and receiving the control signal to and from the head end apparatus 21 via the control line 23, and a control input/output terminal 3 connected to the control line 23.

The video data processing portion 8 includes a video data buffer memory 6 temporarily storing the video data from the input signal system processing portion 5, and a video data decoding portion 7 which decodes the video data. The video data decoding portion 7 includes a decode counter 20 which increments a count by one, every time one image (one picture) is decoded. The count of the decode counter 20 can be referred to by software executed by the CPU 16.

The audio data processing portion 13 includes an audio data buffer RAM 11 temporarily storing the audio data from the input signal system processing portion 5, and an audio data decoding portion 12 which decodes the audio data.

FIG. 3 is a block diagram showing one embodiment of the control software to be executed by the CPU 16 in the preferred embodiment of the multi-media communication terminal device according to the present invention. Referring to FIG. 3, the control software 25 is constituted by an application 26 and a device driver 28 which are executable by an operating system 27.

A function of the application 26 is to receive operation instructions from a user 24 of the multi-media communication terminal device 1, to provide information to the device driver 28 or to provide a message to the bus 17, which comprises a communication system.

The device driver 28 provides a command for the hardware of a respective signal processing system (the video data processing portion 8 or the audio data processing portion 13 shown in FIG. 2) via the bus 17, which comprises a control system, on the basis of the information provided from the application 26 via the operating system 27. On the other hand, the device driver 28 also obtains information from the hardware of the respective signal processing system via the bus 17, so that the device driver 28 can process the information and provide information to the application 26.

Next, with reference to FIGS. 1–4, the operation of the multi-media communication terminal device 1, when commands demanding jump reproduction (reproduction of past or future audio/video data instead of present audio/video data, for example by rewinding or fast-forwarding a tape at the head end apparatus) are sequentially input by the user of the multi-media communication terminal device 1, will be discussed. FIG. 4 is a sequence chart showing operation of the disclosed embodiment of the multi-media communication terminal device 1.

Assuming that normal reproduction is currently being performed, if a command demanding jump reproduction is input to the application 26 via the input device 19 by the user of the multi-media communication terminal device 1, the application 26 feeds a request (S2) for stopping transmission of the currently transmitted data to the head end apparatus 21 (the superior device) under the condition that command input by the user is inhibited (S1).

When a response is returned to the application 26 from the head end apparatus 21 (S3), the application 26 issues a jump processing demand (S4) to the device driver 28, for performing jump processing with the hardware (5, 6, 7, 9, 11, 12, 14 and 18 in FIG. 2) of the signal processing system. Then, the device driver 28 issues a command for synchronizing the video and audio data (S5) in the newly transmitted data to the hardware of the signal processing system.

Here, it is assumed that additional steps are taken to clear the most recent stored data in the buffer memories 6 and 11 in the multi-media communication terminal device 1, and to decode the header which is added for every given unit of the newly transmitted data to establish synchronization at a time when the code indicative of the start of one unit of data is detected, in order to establish synchronization between video and audio of the multi-media data transmitted at a constant rate.

Then, a response (S6) upon completion of the synchronization of the video and audio is received from the device driver 28, and then the application 26 transmits a demand (S7) to the superior device for transmission of jump destination data (the audio/video data at the past or future destination address that is desired to be displayed). Then the head end apparatus 21 issues a response (S8) to the demand (S7).

Conventionally, at a time when the application 26 receives the response (S8) to the jump destination data demand (S7) from the head end apparatus 21, command input from the user is still permitted. In this connection, it is possible for the application to permit input of the next command before the jump destination data reaches the multi-media communication terminal device 1. Accordingly, it is possible for the next command to be input after the jump destination data was already transmitted from the head end apparatus 21 and while it is still present on the transmission line. In such case, an error can be caused between the data transmission timing and video/audio synchronization process timing to cause a synchronization error between the video and the audio, to cause either the display of an unnecessary image or a disturbance of the image displayed. However, this problem can be avoided according to the present invention, by processing the jump destination data without permitting command input from the user during this processing.

After the jump destination data from the head end apparatus 21 reaches the multi-media communication terminal device 1 via the transmission line 22 (S9) after receiving the response to the jump destination data demand from the head end apparatus 21 (S8), decoding of the image is initiated by the video data decoding portion 7.

Upon the decoding of the new image by the video data decoding portion 7 (S10), interruption of the CPU 16 is triggered. Interruption is detected by the device driver 28 in the control software 25, and the device driver 28 transfers a message notifying that the new image has been decoded, to the application (S11). Then, the application 26 in response to this message again permits command input from the user which has up to now been inhibited.

By not permitting a next command to be input until the jump process has been completed and the decoding process of the image corresponding to the command has been performed, by the process set forth above, the multi-media communication terminal device successfully controls sequential input commands so as to prevent disturbance of the image displayed.

In the embodiment of FIG. 4, the transmission of the currently transmitted data from the head end apparatus (the superior device) is interrupted in order to perform synchronization of the video and audio reproduction. However, it is also possible to perform synchronization of the video and audio by interrupting the processing of the data from the head end apparatus 21. An alternative embodiment implementing the latter process will be discussed hereinafter with reference to FIGS. 1, 2, 3 and 5.

Assuming that normal reproduction is currently in process, when a command demanding jump reproduction is input to the application 26 via the input device 19 by the user 24 of the multi-media communication terminal device 1, the application 26 interrupts transmission of the currently transmitted data from the head end apparatus 21, under the condition that command input by the user is inhibited (S21). Subsequently, a transmission start demand is transmitted after search of data of the jump destination (S22).

Then a response is returned to the application 26 by the head end apparatus 21 (S23), and the application 26 executed the jump processing demand to perform the jump process using the hardware of the signal processing system for the device driver 28 (S24).

The device driver 28 issues a command which interrupts the separation of the video data and the audio data by the input signal system processing portion 5 (S25). Then, a command is given to the signal processing hardware to establish synchronization of the video and audio in the newly transmitted data (S26) from the superior device. After completion of the synchronization process of video and audio, a command is given for again initiating the separation process of the video data and the audio data of the input multi-media data (S27). The device driver 28 sends back a response to the application 27 (S28).

In the embodiment of FIG. 5, during a search period, in which a search for the jump destination data is performed by the head end apparatus 21, synchronization of video and audio is established in the multi-media communication terminal device. Accordingly, after synchronization of the video and audio data, jump destination data is transmitted from the head end apparatus.

Conventionally, the input of commands by the user is permitted at the time of receiving a response with respect to the jump processing demand to the device driver 28 of the application 26. When the jump command is sequentially input from the user, an error may be caused between the time the jump destination data is transmitted from the head end apparatus 21 and the time of internal processing of the input command in the multi-media communication terminal device 1, which causes a problem in that the video and audio output corresponding to the demand by the user cannot be performed. This problem can be avoided by not permitting command input from the user, so that the problem in the subsequent process can be avoided.

After the application 26 receives the response to the jump processing demand from the device driver 28 (S28), the jump destination data from the head end apparatus 21 reaches the multi-media communication terminal device 1 through the transmission line 22 (S29). Then, decoding of the image by the video data decoding portion 7 is initiated.

Once decoding of the new image in the video data decoding portion 7 is detected (S30), interruption is caused by CPU 16.

When interruption of the process is confirmed by the device driver 28 in the control software, the device driver 28 transfers the message notifying that a new image has been decoded with respect to the application 26 (S31). The application again permits command input from the user in response to this message (S32).

As set forth above, in the embodiment shown, since the next command will not be accepted until the jump process is completed and the newly transmitted image requested by the jump command has been decoded, input command control at the multi-media communication terminal device becomes possible.

While the two embodiments has been discussed in terms of sequential input of the jump command, the present invention is flexible enough to be adapted not only to control the input of the jump command but also to control the sequential input of a command for another reproduction mode, or sequential input of commands for a plurality of reproduction modes.

As set forth above, according to the present invention, when sequential input of commands is made by the user, a next reproduction command from the user is not accepted upon completion of reception process of the currently received reproduction command, and instead, the next input command is accepted only after confirmation of interruption of the CPU process due to initiation of multi-media data, particularly the video data, from the superior device.

Also, when synchronization of video and audio is required, the data demanded by the user can be reliably received from the superior device. Accordingly, error can be avoided between the data transmission timing from the superior device and the video/audio synchronization process timing in the multi-media communication terminal device resulting in unwanted disturbance of the image and so forth. Also, it can successfully avoid the problem that the video and audio output demanded by the user cannot be obtained.

Furthermore, according to the present invention, since operation in the overall multi-media communication system becomes stable, reliability of the system of the user can be significantly improved.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. In a cable television terminal device including a CPU, a command input control system controlling the input by a user of first and second sequential commands for controlling video data transmitted from a center to said terminal device via a communication line in a cable television system, comprising;

a command input system inhibiting input of a second command by the user until confirmation is received that said CPU has been interrupted due to supply of video data corresponding to a first input command from said center and decoding of said video data has been initiated.

2. A command input control system as set forth in claim 1, wherein said command input inhibiting system includes a system for transmitting a command demanding interruption of the video data currently being transmitted from said center.

3. A command input control system as set forth in claim 2, wherein said command input inhibiting system includes a system for demanding transmission of the video data corresponding to the first input command to said center after receiving a response to the command demanding interruption of transmission.

4. A command input control system as set forth in claim 1, wherein the data transmitted from said center via the communication line includes audio data, and said command input inhibiting system includes a system for establishing synchronization of newly transmitted video data and audio data.

5. A command input control system as set forth in claim 1, wherein said command input inhibiting system includes a system for interrupting transmission of currently transmitted data from said center, and subsequently, transmiting a start demand to said center.

6. A command input control system as set forth in claim 1, wherein said command input inhibiting system comprises application software.

7. A command input control system as set forth in claim 4, wherein said system for establishing synchronization of the video data and the audio data in the newly transmitted data comprises device driver software.

8. A command input control method performed in a cable television terminal device including a CPU, for controlling the input by a user of first and second sequential commands to the terminal device for controlling video data transmitted from a center to said terminal device via a communication line in a cable television system, comprising the steps of:

a command input inhibiting step of inhibiting input by the user of a second command to the terminal device until confirmation is received that said CPU has been interrupted due to supply of video data corresponding to a first input command from said center and decoding of said video data has been initiated.

9. A command input control method as set forth in claim 8, wherein said command input step includes the step of transmitting a command demanding interruption of the video data currently being transmitted from said center.

10. A command input control method as set forth in claim 9, wherein said command input inhibiting step includes the step of demanding transmission of the video data corresponding to the first input command to said center after receiving a response to the command demanding interruption of transmission.

11. A command input control method as set forth in claim 8, wherein the data transmitted from said center via the communication line includes audio data, and said command input inhibiting step includes the step of establishing synchronization of newly transmitted video data and audio data.

12. A command input control method as set forth in claim 8, wherein said command input inhibiting step includes the step of interrupting transmission of currently transmitted data from said center, and subsequently, transmiting a start demand to said center.

13. A multi-media cable television communication terminal device for receiving multi-media data including a video data component and an audio data component from a data source through a communication network in a cable television system, comprising:

a data input connected to said data source via said communication network and receiving said multi-media data from said data source;

a data processing system including a CPU processing said multi-media data for reproducing video data contained in said video data component and audio data contained in said audio data component;

a user interface permitting a user to interactively input first and second sequential commands for controlling transmission of said multi-media data, said user interface including a command input inhibiting system inhibiting input of a second command by the user until confirmation is received that said CPU has been interrupted due to supply of video data corresponding to a first input command from said data source and decoding of said video data has been initiated; and a data output connected to a video output device for visually reproducing said video data and an audio output device for audibly reproducing said audio data.

14. A multi-media communication terminal device as set forth in claim 13, wherein said command input inhibiting system includes a system for transmitting a command demanding interruption of the video data currently being transmitted from said data source.

15. A multi-media communication terminal device as set forth in claim 14, wherein said command input inhibiting system includes a system for demanding transmission of the video data corresponding to the first input command to said data source after receiving a response to the command demanding interruption of transmission.

16. A multi-media communication terminal device as set forth in claim 13, wherein the data transmitted from said data source via the communication line includes audio data, and said command input inhibiting system includes a system for establishing synchronization of newly transmitted video data and audio data.

17. A multi-media communication terminal device as set forth in claim 13, wherein said command input inhibiting system includes a system for interrupting transmission of currently transmitted data from said data source, and subsequently, transmiting a start demand to said data source.

18. A multi-media communication terminal device as set forth in claim 13, wherein said command input inhibiting system comprises application software.

19. A multi-media communication terminal device as set forth in claim 16, wherein said system for establishing synchronization of the video data and the audio data in the newly transmitted data comprises device driver software.

* * * * *